United States Patent [19]

Norton

[11] 3,868,400

[45] Feb. 25, 1975

[54] PROCESS FOR VAPOR PHASE AMMOXIDATION

[75] Inventor: Richard V. Norton, Wilmington, Del.

[73] Assignee: Sun Research and Development Co., Marcus Hook, Pa.

[22] Filed: May 4, 1973

[21] Appl. No.: 357,145

[52] U.S. Cl......... 260/464, 260/250 R, 260/250 A, 260/251 R, 260/283 CN, 260/302 R, 260/307 R, 260/309, 260/310 R, 260/319.1, 260/326.62, 260/329 R, 260/345.1, 260/346.1 R, 260/465 C, 260/465 F, 260/465.3
[51] Int. Cl. .......................................... C07c 121/02
[58] Field of Search............. 260/465.3, 465 C, 464, 260/465 F

[56] References Cited
UNITED STATES PATENTS

| | | | |
|---|---|---|---|
| 2,833,807 | 5/1958 | Farkas et al. ................... | 260/465 C |
| 3,278,573 | 10/1966 | Kroeper et al. ................. | 260/465 C |
| 3,309,395 | 3/1967 | Nohe et al. ...................... | 260/465.3 |
| 3,312,710 | 4/1967 | Sakuyama et al. .......... | 260/465 C X |
| 3,394,167 | 7/1968 | Palm et al. ....................... | 260/465.3 |
| 3,414,606 | 12/1968 | Winderl et al. .................. | 260/465.3 |
| 3,433,823 | 3/1969 | McMahon................... | 260/465 C X |
| 3,475,350 | 10/1969 | Winnick et al. ............. | 260/465 C X |
| 3,535,366 | 10/1970 | Yoo et al. ........................ | 260/465 C |
| 3,625,867 | 12/1971 | Yoshino et al. .................. | 260/465.3 |
| 3,637,797 | 1/1972 | Decker et al. .................. | 260/465 C |

*Primary Examiner*—Joseph P. Brust
*Attorney, Agent, or Firm*—George L. Church; Donald R. Johnson; Paul Lipsitz

[57] ABSTRACT

In the vapor phase ammoxidation of organic compounds to form nitriles where a reactant stream of ammonia, oxygen, and organic reactant is passed over catalyst, the improvement which comprises including carbon monoxide in the reactant stream whereby burn loss of ammonia and organic reactant is reduced and the conversion to nitriles is significantly increased.

11 Claims, No Drawings

PROCESS FOR VAPOR PHASE AMMOXIDATION

The vapor phase ammoxidation of organic compounds to nitriles is well known and is exemplified by U.S. Pat. No. 2,463,457 (Denton, assigned to Socony-Vacuum Oil Co., issued Mar. 1, 1949) and by U.S. Pat. No. 2,496,661 (Denton, assigned to Socony-Vacuum Oil Co., issued Feb. 7, 1950). This process is particularly useful for preparing nitriles of alkyl-substituted aromatic hydrocarbons, as for example, conversion of toluene to benzonitrile xylenes to toluonitriles and phthalonitriles, and the like, and is also of value generally for converting alkyl-substituted aliphatic, aromatic, alicyclic, and heterocyclic compounds to the corresponding nitriles.

In carrying out the process a catalyst is used and a preferred catalyst may be an oxide, salt, or acid of vanadium, molybdenum, tungsten or their mixture (see, for example, U.S. Pat. No. 2,496,661). In starting up the process the art teaches that the catalyst should be conditioned in order to have initial maximum catalytic efficiency and this is done by exposing it to ammonia, hydrogen, or both for a period of time, usually several minutes to several hours. Then, the process is started by passing the reactant stream composed of organic reactant, ammonia, and oxygen over the catalyst under reaction conditions. In some ammoxidation processes, oxygen is omitted from the reactant stream, but is provided in-situ by the high oxidation state oxide catalyst.

One of the problems inherent in an ammoxidation system and particularly in a system employing added oxygen in the reactant stream is the undesirable burn of the organic reactant (usually a hydrocarbon) and ammonia to unwanted by-products rather than nitrile products. This, of course, adds to process costs in that more reagent is required to produce a given amount of nitrile (e.g., yields are reduced) and also larger capital investment is required to build a plant for a given capacity. Obviously then, a reduction in the undesired burning of ammonia and organic reactant with the attendant yield increase is a desirable objective.

It has now been found that in the vapor phase ammoxidation of alkyl-substituted organic compounds, the yield of nitrile product can be very significantly increased and ammonia and hydrocarbon burn mitigated, and this is accomplished in accord with this invention, by incorporating carbon monoxide with the reactant stream to the ammoxidation reaction system.

In carrying out the process of the invention, the reactor and attendant equipment is prepared in the usual way, the reactor being charged with catalyst and otherwise prepared for start-up including the conditioning of catalyst if desired. The organic reactant, ammonia, oxygen and carbon monoxide stream is then passed over the catalyst at reaction conditions which will be about 300° to about 600°C, preferably about 375° to 475°C and at pressures ranging from atmospheric to about 100 psig. Most preferred treatment conditions will be about 400° to about 450°C at essentially atmospheric pressure.

When introducing the reactants to the catalyst, it is desirable to add the carbon monoxide stream after the other reactants have been started through the system. This procedure avoids reduction of the catalyst to a lower valence state which is less active for ammoxidation reaction. A preferred way to introduce the reactant gas stream is to premix the carbon monoxide, hydrocarbon, ammonia, and oxygen and pass them through a preheater section at about 350° to about 450° before passing the mixture over the catalyst.

The ratio of reactants is not critical to the operation of the ammoxidation system, but the process will generally employ a mole ratio (based on one alkyl group being converted to a nitrile group) of ammonia to organic reactant of 1.5:1 to 10:1 (preferably, about 1.5:1 to 2:1), an oxygen to organic reactant mole ratio of 1.5:1 to 10:1 (preferably, about 1.5:1 to 2:1), and a carbon monoxide to organic reactant ratio of 0.5:1 to 15:1 (preferably, 1:1 to 5:1 for a hydrocarbon such as p-xylene and 8:1 to 15:1 for a nonhydrocarbon reactant such as p-cresol).

It will be understood that the oxygen used in the system may be pure oxygen or it may be obtained from air. If it is desired to avoid dilution of the input reactant gases, pure oxygen is preferably used. On the other hand, air as a source of oxygen is much more economical and the choice will depend upon the particular engineering of the system.

It is to be understood that the ammoxidation reaction conditions (e.g., temperature, contact time, pressure, etc.) need not be changed in any way from those normally used as disclosed in the numerous well known patent and literature references, including the patents mentioned above. It will also be understood that the process of the invention will use an ammmoxidation catalyst and may employ both fresh and regenerated catalyst, regeneration of catalyst being conducted in the usual manner by passing oxygen (from air or other source) over it at elevated temperature. Likewise, the process is applicable to fixed bed and fluidized bed systems of operation. Preferred catalyst systems will be the numerous well-known ammoxidation catalysts such as the oxides of molybdenum, vanadium, tungsten, and the like. Also, other materials such as uranyl molybdate, iron, lead, sodium and copper molybdates and mixed catalysts may also be used.

The organic reactants useful in the process may be selected from a wide variety of compounds and will include alkyl-substituted aromatic, aliphatic, alicyclic, and heterocyclic compounds. Among preferred starting materials are the mono- and polyalkyl-substituted aromatic hydrocarbons and phenolic compounds such as toluene, the xylenes, α-methylnaphthalene, polymethylnaphthalenes, (e.g., 2,6-dimethylnaphthalene), monoalkyl- and polyalkylanthracenes, mesitylene, durene, the cresols, alkyl-substituted naphthols, and the like. The alkyl substituent may, of course, contain more than a single carbon atom and thus the corresponding ethyl and other lower alkyl substituents are also useful.

Aliphatic compounds normally subjected to ammoxidation include the olefinic compounds. Thus, any olefinic hydrocarbon having at least one alkyl group is useful in the process. Examples of such compounds are propylene, butenes, octenes, methyl heptenes, alkylbutadienes, pentadienes, ethyl butenes, hexadienes, heptadienes, and the like all of which will give the corresponding nitriles. Preferred olefins are those containing up to about ten carbon atoms, particularly propylene, butenes, and the methylbutadienes and cycloolefinic compounds, particularly the alkyl-substituted hydrocarbon olefins exemplified by 3-methyl cyclohexene, 3,6-dimethyl cyclohexene, methyl tetralin, and the like.

3,868,400

Also of value as reactants are alicyclic compounds having an alkyl substituent and these compounds are exemplified by methylcyclopentane, methylcyclohexane, the alkyl-substituted decalins, and the like.

The heterocyclic compounds useful as organic reactants in the process will include alkyl-substituted furans, pyrroles, indoles, thiophenes, pyrazoles, imidazoles, thiazoles, oxazoles, pyrans, pyridines, quinolines, isoquinolines, pyrimidines, pyridazines, pyrazines, and the like, all of which are converted to the corresponding nitriles. Preferred reactants in this group are the mono-, di-, and tri-alkyl pyridines.

The phenolic materials useful in the invention will include those aromatic hydrocarbons having at least one substituted alkyl and hydroxy groups and thus will include cresols, such as o-cresol, m-cresol, p-cresol and their mixtures, thymol, carvacrol, 2,6-ditertbutylphenol, α-methyl-β-naphthol, and 1-hydroxy-2,6-dimethyl naphthalene.

In order to more fully describe and illustrate the invention, the following examples and data in the table are given:

Examples I-III

A catalyst of composition $7.5V_2O_5:7WO_3:3Sb_2O_3:0.5k$ prepared as in U.S. Pat. No. 3,636,797 and contained in a standard quartz tabular reactor was treated with p-xylene, air, ammonia and carbon monoxide in the mole ratios and for a contact time shown under Examples I-III in the table. Analysis were done by a combination of VPC, gravimetric and titrametric techniques.

In examples I and II the difference in carbon monoxide to hydrocarbon mole ratios did not show much variation in yield, hydrocarbon burn, or ammonia burn. In the absence of CO, however, the ammonia burn was almost doubled and the hydrocarbon burn was noticeably increased.

Examples IV and V

An $Al_2O_3$-Mo oxide catalyst prepared as in Japanese Pat. No. 69, (17,376) served as the catalyst in a fixed bed quartz apparatus. The presence of CO in a ratio of 4:1 CO: hydrocarbon greatly improved the performance of the catalyst.

Examples VI and VII

A catalyst of composition $4Sb_2O_3:V_2O_3:SiO_2$ prepared as in Netherlands Patent Application 69, (11,823) was treated with p-cresol as the organic reactant in the manner of Examples I-V. However, in this case, 30 moles $H_2O$/mole of organic reactant were used as an adjuvent and pure $O_2$ was used instead of air.

A significantly reduced hydrocarbon burn and noticeably decreased $NH_3$ burn was found for the example employing carbon monoxide.

Examples VIII and IX

Vanadium pentoxide (18.9 g, 0.104 moles) and sodium oxide (1.08 g, 0.017 moles) were mixed with gamma alumina powder and ground to a fine powder in a high speed blender (15 minutes). Water was added and the slurry ground an additional 30 minutes. The water was evaporated on a stream bath until a paste resulted and this was loaded into a pellet tray and dried. The pellets, after drying, were activated at 540°C for 4 hours in a sweep of air.

The catalyst was used as in Examples I-VII and as shown by Example VIII the yield of terephthalonitrile is greatly increased over the control experiment IX.

| Ex | Catalyst | Rx Temp (°C) | Res. Time (sec) | Mole Ratio $HC^{(e)}:O_2:NH_3$ | Reactant | Mole Ratio CO:HC | Nitrile Yield (mole %) | $HC^{(e)}$ burn (mole %) | $NH_3$ burn (mole %) |
|---|---|---|---|---|---|---|---|---|---|
| I | $7.5V_2O_5:7WO_3:3Sb_2O_3:0.5K$ | 455 | 1.0 | 1:5.8:3.0 | p-Xylene | 3:1 | 81.4$^{(a)}$ | 13 | 24 |
| II | $7.5V_2O_5:7WO_3:3Sb_2O_3:0.5K$ | 455 | 1.0 | 1:5.8:3.0 | p-Xylene | 5:1 | 76.3$^{(a)}$ | 15 | 21 |
| III | $7.5V_2O_5:7WO_3:3Sb_2O_3:0.5K$ (Control U.S. 3,637,797) | 460 | 1.0 | 1:5.8:3.0 | p-Xylene | 0 | 79.3$^{(a)}$ | 21 | 47 |
| IV | $Al_2O_3$-Mo oxide (Japan 69, 17,376) | 400 | 3 | 1:2:2 | Toluene | 4:1 | 57.3$^{(b)}$ | 4.1 | 21.2 |
| V | Control $Al_2O_3$-Mo oxide (Japan 69, 17, 376) | 385 | 4 | 1:2:2 | Toluene | 0 | 38.6$^{(b)}$ | 17 | 31 |
| VI | $4Sb_2O_3:V_2O_3:SiO_2$ | 400 | 2 | 1:10:6.0:30$H_2O$ | p-Cresol | 15:1 | 55.0$^{(c)}$ | 27 | 30 |
| VII | Control $4Sb_2O_3:V_2O_3:SiO_2$ Neth. Appl. 69 11, 823 | 375 | 3 | 1:10:7.0:30$H_2O$ | p-Cresol | 0 | 52.0$^{(c)}$ | 47 | 41 |
| VIII | $V_2O_5.0.5K_2O.Al_2O_3$ | 400 | 3 | 1:10:5 | 1,4-Dimethyl cyclohexane | 4:1 | 41.0$^{(d)}$ | 41 | 26 |
| IX | $V_2O_5.0.5K_2O.Al_2O_3$ | 400 | 3 | 1:10:5 | 1,4-Dimethyl cyclohexane | 0 | 23.0$^{(d)}$ | 72 | 37 |

$^{(a)}$product is mixture of terephthalonitrile and toluonitrile
$^{(b)}$product is toluonitrile
$^{(c)}$product is p-cyanophenol
$^{(d)}$product is terephthalonitrile
$^{(e)}$HC = hydrocarbon

Example X

Following the details of the above examples, 2,6-dimethylnaphthalene is converted to a mixture of 2-methyl-6-cyanonaphthalene and 2,6-dicyanonaphthalene in good yield using the catalyst of Example VIII and carrying out the process at 430° to 450°C and at molar ratios of hydrocarbon to oxygen to ammonia of 1:6:5 and a mole ratio of carbon monoxide to hydrocarbon of 5:1.

The invention claimed is:

1. In a process for the preparation of nitriles by ammoxidation the improvement which comprises passing as a reactant stream a mixture of vapors comprised of (1) an organic reactant consisting essentially of a lower alkyl-substituted aromatic hydrocarbon selected from the group of benzene, naphthalene and anthracene, a lower alkyl-substituted alicyclic hydrocarbon containing from about five to about ten carbon atoms in the ring, a lower alkyl-substituted monohydroxy benzene or monohydroxy naphthalene, (2) ammonia, (3) oxygen, and (4) carbon monoxide over an ammoxidation catalyst at a temperature of about 300° to about 600°C, the mole ratio of reactants per mole of hydrocarbon or monohydroxy compound based on one alkyl group being converted to a nitrile group, being as follows: ammonia, 1.5:1 to 10:1; oxygen, 1.5:1 to 10:1, and carbon monoxide, 0.5:1 to 15:1, whereby burn loss of ammonia and organic reactant is reduced and the conversion to nitrile is significantly increased.

2. The process of claim 1 where the organic reactant is an alkyl-substituted hydrocarbon and the molar ratio of ammonia is 1.5:1 to 2:1; of oxygen 1.5:1 to 2:1, and of CO 0.5:1 to 5:1 and the temperature is 375° to 475°C.

3. The process of claim 2 where the alkyl-substituted hydrocarbon is xylene.

4. The process of claim 2 where the alkyl-substituted hydrocarbon is p-xylene.

5. The process of claim 2 where the alkyl-substituted hydrocarbon is toluene.

6. The process of claim 2 where the alkyl-substituted hydrocarbon is 1,4-dimethylcyclohexane.

7. The process of claim 2 where the alkyl-substituted hydrocarbon is 2,6-dimethylnaphthalene.

8. The process of claim 1 where the catalyst is an oxide of molybdenum, vanadium, or tungsten.

9. The process of claim 1 where the catalyst is an oxide of vanadium.

10. The process of claim 1 where the organic reactant is an alkyl-substituted phenol and the molar ratio of ammonia is 1.5:1 to 2:1; of oxygen 1.5:1 to 1:1 and of CO 8:1 to 15:1.

11. The process of claim 10 where the phenol is p-cresol.

* * * * *

UNITED STATES PATENT OFFICE
CERTIFICATE OF CORRECTION

PATENT NO. : 3,868,400
DATED : February 25, 1975
INVENTOR(S) : Richard V. Norton It is certified that error appears in the above–identified patent and that said Letters Patent are hereby corrected as shown below:

Column 3, line 48, delete "3,636,797" and insert ---3,637,797---.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*